United States Patent
Andreopoulos

(10) Patent No.: US 11,252,417 B2
(45) Date of Patent: Feb. 15, 2022

(54) IMAGE DATA PROCESSING

(71) Applicant: iSize Limited, London (GB)

(72) Inventor: Ioannis Andreopoulos, London (GB)

(73) Assignee: Size Limited, London (GB)

( * ) Notice: Subject to any disclaimer, the term of this patent is extended or adjusted under 35 U.S.C. 154(b) by 0 days.

(21) Appl. No.: 17/039,563

(22) Filed: Sep. 30, 2020

(65) Prior Publication Data

US 2021/0211684 A1 Jul. 8, 2021

Related U.S. Application Data

(60) Provisional application No. 63/023,883, filed on May 13, 2020, provisional application No. 63/012,339,
(Continued)

(51) Int. Cl.
*H04N 7/12* (2006.01)
*H04N 19/176* (2014.01)
(Continued)

(52) U.S. Cl.
CPC .......... *H04N 19/176* (2014.11); *H04N 19/12* (2014.11); *H04N 19/124* (2014.11);
(Continued)

(58) Field of Classification Search
CPC .... H04N 19/176; H04N 19/147; H04N 19/61; H04N 19/172; H04N 19/12;
(Continued)

(56) References Cited

U.S. PATENT DOCUMENTS 5,515,477 A * 5/1996 Sutherland .......... G06K 9/6232
706/41
2009/0304071 A1 12/2009 Shi et al.
(Continued)

FOREIGN PATENT DOCUMENTS

CN 110248190 A 9/2019
EP 1605362 A1 12/2005
(Continued)

OTHER PUBLICATIONS

Dong et al., "Adaptive downsampling for high-definition video coding." IEEE Transactions on Circuits and Systems for Video Technology 24.3 (2014): 480-488.
(Continued)

*Primary Examiner* — Gims S Philippe
(74) *Attorney, Agent, or Firm* — Patterson + Sheridan LLP

(57) ABSTRACT

A method of configuring an image encoder emulator. Input image data is encoded at an encoding stage comprising a network of inter-connected weights, and decoded at a decoding stage to generate a first distorted version of the input image data. The first distorted version is compared with a second distorted version of the input image data generated using an external encoder to determine a distortion difference score. A rate prediction model is used to predict an encoding bitrate associated with encoding the input image data to a quality corresponding to the first distorted version. A rate difference score is determined by comparing the predicted encoding bitrate with an encoding bitrate used by the external encoder to encode the input image data to a quality corresponding to the second distorted version. The weights of the encoding stage are trained based on the distortion difference score and the rate difference score.

15 Claims, 9 Drawing Sheets

Related U.S. Application Data filed on Apr. 20, 2020, provisional application No. 62/971,994, filed on Feb. 9, 2020, provisional application No. 62/962,971, filed on Jan. 18, 2020, provisional application No. 62/962,970, filed on Jan. 18, 2020, provisional application No. 62/957,286, filed on Jan. 5, 2020.

(51) Int. Cl.

| | | |
|---|---|---|
| H04N 19/147 | (2014.01) | |
| H04N 19/172 | (2014.01) | |
| H04N 19/61 | (2014.01) | |
| H04N 19/12 | (2014.01) | |
| H04N 19/136 | (2014.01) | |
| H04N 19/182 | (2014.01) | |
| H04N 19/184 | (2014.01) | |
| H04N 19/44 | (2014.01) | |
| H04N 19/85 | (2014.01) | |
| H04N 19/126 | (2014.01) | |
| H04N 19/65 | (2014.01) | |
| H04N 19/86 | (2014.01) | |
| H04N 21/2662 | (2011.01) | |
| H04N 19/124 | (2014.01) | |
| H04N 19/154 | (2014.01) | |

(52) U.S. Cl.
CPC ......... *H04N 19/126* (2014.11); *H04N 19/136* (2014.11); *H04N 19/147* (2014.11); *H04N 19/154* (2014.11); *H04N 19/172* (2014.11); *H04N 19/182* (2014.11); *H04N 19/184* (2014.11); *H04N 19/44* (2014.11); *H04N 19/61* (2014.11); *H04N 19/65* (2014.11); *H04N 19/85* (2014.11); *H04N 19/86* (2014.11); *H04N 21/2662* (2013.01)

(58) Field of Classification Search
CPC .. H04N 19/124; H04N 19/126; H04N 19/136; H04N 21/2662; H04N 19/154; H04N 19/182; H04N 19/184; H04N 19/44; H04N 19/65; H04N 19/85; H04N 19/86; H04N 19/103; H04N 21/23439; H04N 19/177; G06N 3/088; G06N 3/045; G03G 15/5004
USPC .................................................. 375/240.12
See application file for complete search history.

(56) References Cited

U.S. PATENT DOCUMENTS

| | | | |
|---|---|---|---|
| 2010/0119156 A1 | 5/2010 | Noguchi et al. | |
| 2012/0033040 A1 | 2/2012 | Pahalawatta et al. | |
| 2015/0042878 A1 | 2/2015 | Jeon et al. | |
| 2017/0148222 A1* | 5/2017 | Holzer | H04N 13/279 |
| 2017/0234671 A1* | 8/2017 | Kuhnen | G01B 7/08 324/662 |
| 2017/0347026 A1 | 11/2017 | Hannuksela | |
| 2018/0131953 A1 | 5/2018 | Wang et al. | |
| 2019/0045195 A1* | 2/2019 | Gokhale | H04N 19/137 |
| 2019/0370638 A1* | 12/2019 | Green | G06N 3/084 |
| 2020/0020082 A1* | 1/2020 | Zahneisen | G06T 5/006 |
| 2020/0092552 A1* | 3/2020 | Coelho | H04N 19/119 |
| 2020/0145661 A1* | 5/2020 | Jeon | H04N 19/136 |
| 2020/0186808 A1* | 6/2020 | Joshi | H04N 19/176 |
| 2020/0210726 A1* | 7/2020 | Yang | G06N 3/04 |

FOREIGN PATENT DOCUMENTS

| | | |
|---|---|---|
| EP | 3493149 A1 | 6/2019 |
| EP | 3584676 A1 | 12/2019 |
| GB | 2548749 A | 9/2017 |
| WO | 9962265 A1 | 12/1999 |
| WO | 2014018050 A1 | 1/2014 |
| WO | 2016132152 A1 | 8/2016 |
| WO | 2018229490 A1 | 12/2018 |
| WO | 2019009449 A1 | 1/2019 |
| WO | 2019009489 A1 | 1/2019 |
| WO | 2019182703 A1 | 9/2019 |
| WO | 2019197712 A1 | 10/2019 |
| WO | 2019220095 A1 | 11/2019 |

OTHER PUBLICATIONS

Shen et al., "Down-sampling based video coding using super-resolution technique." IEEE Transactions on Circuits and Systems for Video Technology21.6 (2011): 755-765.

Dar et al., "Improving low bit-rate video coding using spatio-temporal down-scaling." arXiv preprint arXiv:1404.4026 (2014).

Nguyen et al., Adaptive downsampling/upsampling for better video compression at low bit rate. Circuits and Systems, 2008. ISCAS 2008. IEEE International Symposium on. IEEE, 2008.

Hinton et al. "Reducing the dimensionality of data with neural networks." science313.5786 (2006): 504-507.

Van Den Oord et al. "Conditional image generation with pixelcnn decoders." Advances in Neural Information Processing Systems. 2016.

Theis et al., "Lossy image compression with compressive autoencoders." arXiv preprint arXiv:1703.00395(2017).

Wu et al., "Video Compression through Image Interpolation." arXiv preprint arXiv:1804.06919 (2018).

Rippel et al., "Real-time adaptive image compression." arXiv preprint arXiv:1705.05823 (2017).

Golub et al., Matrix computations. vol. 3. JHU Press, 2012.

Timofte et al., "NTIRE 2017 challenge on single image super-resolution: Methods and results," Proc. Comp. Vis. and Pattern Recognition Workshops (CVPRW), 2017 IEEE Conf. on Comp. Vis. and Pattern Recognition, CVPR, IEEE, 2017, https://goo.gl/TQRT7E.

Lim et al. "Enhanced deep residual networks for single image super-resolution," Proc. Comp. Vis. and Pattern Recognition Workshops (CVPRW), 2017 IEEE Conf. on Comp. Vis. and Pattern Recogn., CVPR, IEEE, 2017, https://goo.gl/PDSTiV.

Dong, et al., "Accelerating the super-resolution convolutional neural network," Proc. 2016 IEEE Conf. on Comp. Vis. and Pattern Recognition, CVPR, IEEE, 2016, https://goo.gl/Qa1UmX.Dong, Jie, and Yan Ye. "Adaptive downsampling for high-definition video coding." IEEE Transactions on Circuits and Systems for Video Technology 24.3 (2014): 480-488.

Dong et al., "Learning a deep convolutional network for image super-resolution," Proc. ECCV (2014) 184-199.

Dong et al., "Image super-resolution using deep convolutional networks," IEEE TPAMI 38(2) (2015) 295-307.

Yang et al., "Fast direct super-resolution by simple functions," Proc. ICCV. (2013) 561-568.

Dong et al., Accelerating the Super-Resolution Convolutional Neural Network, Proc. ICCV (2016).

Han et al., "Deep compression: Compressing deep neural networks with pruning, trained quantization and huffman coding," arXiv preprint arXiv: 1510.00149 (2015).

Han, et al., "Learning both weights and connections for efficient neural network," Advances in neural information processing systems. 2015.

Iandola, et al., "SqueezeNet: AlexNet-level accuracy with 50x fewer parameters and< 0.5 MB model size," arXiv preprint arXiv:1602.07360 (2016).

LeCun et al, "Deep learning," Nature, vol. 521, No. 7553, 2015.

Abadi et al., "TensorFlow: A system for large-scale machine learning," Proc. 12th USENIX Symp. on Oper. Syst. Des. and Implem. (OSDI), Savannah, Georgia, USA. 2016.

Simonyan et al., "Two-stream convolutional networks for action recognition in videos," Proc. Advances in Neural Inf. Process. Syst., NIPS, 2014.

(56) References Cited

OTHER PUBLICATIONS

Sze, et al., "Hardware for machine learning: Challenges and opportunities," arXiv preprint, arXiv:1612.07625, 2016.
Zhang, et al., "Optimizing FPGA-based accelerator design for deep convolutional neural networks," Proc. ACM/SIGDA Int. Symp. Field-Prog. Gate Arr., FPGA. ACM, 2015.
Chen, et al., "DianNao: A small-footprint high-throughput accelerator for ubiquitous machine-learning," Proc. ASPLOS, 2014.
Shafiee et al., "ISAAC: A convolutional neural network accelerator with in-situ analog arithmetic in crossbars," Proc. EEE Int. Symp. on Comp. Archit., ISCA, 2016.
Chi, et al., "PRIME: A novel processing-in-memory architecture for neural network computation in ReRAM-based main memory," Proc. IEEE Int. Symp. on Comp. Archit., ISCA, 2016.
Park, et al., "A 1.93TOPS/W scalable deep learning/inference processor with tetra-parallel MIMD architecture for big data applications," Proc. ISSCC, 2015.
Cavigelli, et al., "Origami: A convolutional network accelerator," Proc. GLVLSI, 2015.
Mathieu, et al., "Fast training of convolutional networks through FFTs," Proc. ICLR, 2014.
Yang, et al., "Designing energy-efficient convolutional neural networks using energy-aware pruning," arXiv preprint arXiv:1611.05128, 2016.
Hsu, "For sale: deep learning," IEEE Spectrum, vol. 53, No. 8, pp. 12-13, Aug. 2016.
Han, et al., "Deep compression: Compressing deep neural network with pruning, trained quantization and Huffman coding," Proc. ICLR, 2016.
Chen et al., "Eyeriss: An energy-efficient reconfigurable accelerator for deep convolutional neural networks," Proc. ISSCC, 2016.
Courbariaux et al., "Binarynet: Training deep neural networks with weights and activations constrained to +1 or −1," arXiv preprint, arXiv:1602.02830, 2016.
Deng et al., "Image aesthetic assessment: An experimental survey," IEEE Signal Processing Magazine, 34(4), pp. 80-106, 2017.
Yu et al., "Multi-scale context aggregation by dilated convolutions," arXiv preprint arXiv:1511.07122, 2015.
Goodfellow et al., "Generative adversarial nets," in Advances in neural information processing systems, 2014.
Salimans et al, "Improved techniques for training gans," in Advances in neural information processing systems, 2016.
Mao et al., "Least squares generative adversarial networks," in Proceedings of the IEEE International Conference on Computer Vision, 2017.
Jolicoeur-Martineau, "The relativistic discriminator: a key element missing from standard GAN," arXiv preprint arXiv: 1807.00734, 2018.
Arjovsky et al., Wasserstein gan, arXiv preprint arXiv:1701.07875, 2017.
Gulrajani et al., "Improved training of wasserstein gans," in Advances in neural information processing systems, 2017.
Mroueh et al., "Fisher gan," in Advances in Neural Information Processing Systems, 2017.
Suehring et al., HHI AVC reference code repository, online at the HHI website. https://avc.hhi.fraunhofer.de/.
Bjontegaard, "Calculation of average PSNR differences between RD-curves," VCEG-M33 (2001).
Wang et al., "SSIM-motivated rate-distortion optimization for video coding." IEEE Transactions on Circuits and Systems for Video Technology 22.4 (2011): 516-529.
Li, et al. "Delay-power-rate-distortion optimization of video representations for dynamic adaptive streaming." IEEE Transactions on Circuits and Systems for Video Technology 28.7 (2017): 1648-1664.
Helmrich, et al. "Perceptually Optimized Bit-Allocation and Associated Distortion Measure for Block-Based Image or Video Coding." 2019 Data Compression Conference (DCC). IEEE, 2019.
Xu et al. "CNN-based rate-distortion modeling for H. 265/HEVC." 2017 IEEE Visual Communications and Image Processing (VCIP). IEEE, 2017.
ZHu et al., "Spatiotemporal visual saliency guided perceptual high efficiency video coding with neural network." Neurocomputing 275 (2018): 511-522.
Bourtsoulatze et al., "Deep video precoding," IEEE Trans. on Circ. and Syst. for Video Technol., to appear in 2020.
Ronneberger et al., U-net: Convolutional networks for biomedical image segmentation, International Conference on Medical image computing and computer-assisted intervention. Springer, Cham, 2015.
Varghese et al. "e-DASH: Modelling an energy-aware DASH player." 2017 IEEE 18th International Symposium on a World of Wireless, Proc. IEEE Mobile and Multimedia Networks (WoWMoM), 2017.
Massouh, et al. "Experimental study on luminance preprocessing for energy-aware HTTP-based mobile video streaming." Proc. IEEE 2014 5th European Workshop on Visual Information Processing (EUVIP).
Hu et al., "Energy-aware video streaming on smartphones." Proc. IEEE Conf. on Computer Communications (INFOCOM). IEEE, 2015.
Almowuena, et al. "Energy-aware and bandwidth-efficient hybrid video streaming over mobile networks." IEEE Trans. on Multimedia 18.1 (2015): 102-115.
Mehrabi, et al. "Energy-aware QoE and backhaul traffic optimization in green edge adaptive mobile video streaming." IEEE Trans, on Green Communications and Networking 3.3 (2019): 828-839.
European Search Report for European Patent Application No. EP20199342, dated Oct. 16, 2020, 4 pages.
European Search Report for European Patent Application No. EP20199345, dated Nov. 18, 2020, 6 pages.
Anonymous: "Autoencoder", Wikipedia, retrieved from the Internet: URL:https://en.wikipedia.org/w/index.php?title=Autoencoder &direction=prev&oldid=930342212, retrieved Mar. 5, 2020, 13 pages.
European Search Report for European Patent Application No. EP20199344, dated Oct. 16, 2020, 4 pages.
European Search Report for European Patent Application No. EP201993447 dated Oct. 23, 2020, 4 pages.
European Search Report for European Patent Application No. EP20199349, dated Oct. 23, 2020, 6 pages.

\* cited by examiner

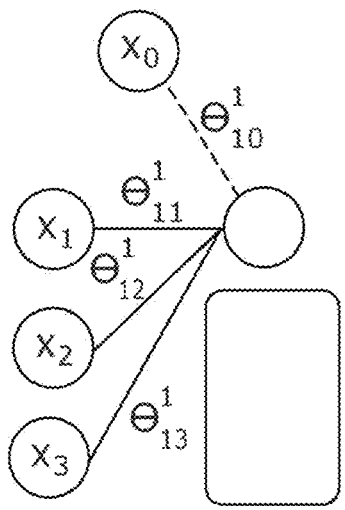

$$g(\Theta_{10}^1 x_0 + \Theta_{11}^1 x_1 + \Theta_{12}^1 x_2 + \Theta_{13}^1 x_3)$$

Figure 2(a)

$\Theta_{13}^1$ means:

1 (superscript) - mapping from layer 1
1 - mapping to node 1 in layer 2 (L+1)
3 - mapping from node 3 in layer 1 (L)

Figure 2(b)

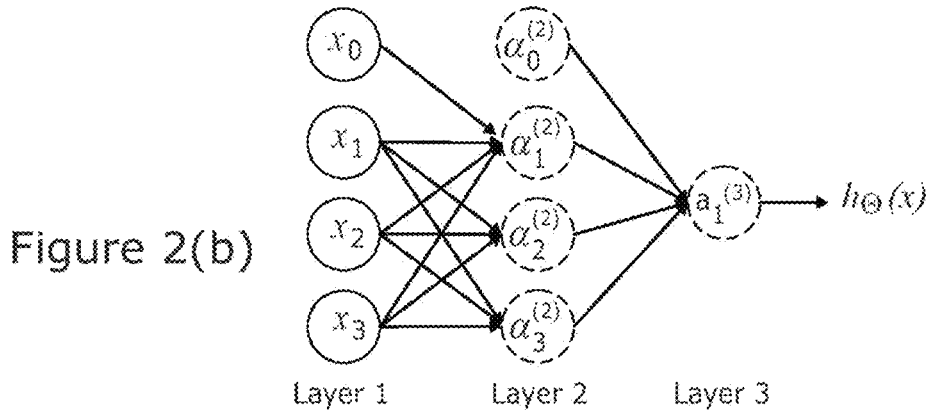

Layer 1  Layer 2  Layer 3

$$a_1^{(2)} = g(\Theta_{10}^{(1)} x_0 + \Theta_{11}^{(1)} x_1 + \Theta_{12}^{(1)} x_2 + \Theta_{13}^{(1)} x_3)$$

$$a_2^{(2)} = g(\Theta_{20}^{(1)} x_0 + \Theta_{21}^{(1)} x_1 + \Theta_{22}^{(1)} x_2 + \Theta_{23}^{(1)} x_3)$$

$$a_3^{(2)} = g(\Theta_{30}^{(1)} x_0 + \Theta_{31}^{(1)} x_1 + \Theta_{32}^{(1)} x_2 + \Theta_{33}^{(1)} x_3)$$

$$h_\Theta(x) = a_1^{(3)} = g(\Theta_{10}^{(2)} a_0^{(2)} + \Theta_{11}^{(2)} a_1^{(2)} + \Theta_{12}^{(2)} a_2^{(2)} + \Theta_{13}^{(2)} a_3^{(2)})$$

| Reference Picture Set (RPS) | Input Mode | CRF | Preset | VMAF of External Codec | VMAF Predicted by the Invention | Rate Relative Error Between: External Codec and the Estimate Provided by the Invention |
|---|---|---|---|---|---|---|
| 0 | (x,xe) | 30 | Medium | 63.83 | 64.68 | 9.02% |
| 0 | (x,xe) | 40 | Medium | 23.90 | 21.37 | 10.85% |
| 1 | (x,xe,xp) | 30 | Medium | 65.77 | 64.01 | 14.60% |

Figure 7

IMAGE DATA PROCESSING

CROSS-REFERENCE TO RELATED APPLICATIONS

This Application claims the benefit of U.S. Provisional Patent Application Nos. 62/957,286, filed on Jan. 5, 2020, 62/962,971, filed on Jan. 18, 2020, 62/962,970, filed on Jan. 18, 2020, 62/971,994, filed on Feb. 9, 2020, 63/012,339, filed on Apr. 20, 2020, and 63/023,883, filed on May 13, 2020, the entire contents of each of which is incorporated herein by reference.

INTRODUCTION

Technical Field

The present disclosure concerns computer-implemented methods for processing image data. In particular, the present disclosure concerns computer-implemented methods for configuring an image encoder emulator for use in image data processing. The disclosure is particularly, but not exclusively, applicable where the image data is video data.

Background

When a set of images or video is streamed over the internet (e.g. using the HTTP protocol), or over a dedicated IP packet switched or circuit-switched connection using other protocols, a range of streaming and encoding recipes must be selected in order to ensure the best possible use of the available bandwidth. To achieve this, (i) the image or video encoder must be tuned to provide for some bitrate control mechanism and (ii) the streaming server must provide for the means to control or switch the stream when the bandwidth of the connection does not suffice for the transmitted data. Methods for tackling bitrate control in (i) include [5]-[8]: constant bitrate (CBR) encoding, variable bitrate (VBR) encoding, or solutions based on a video buffer verifier (VBV) model [5]-[8], such as QVBR, CABR, capped-CRF, etc. These solutions control the parameters of the adaptive quantization and intra-prediction or inter-prediction per image [5]-[8] in order to provide the best possible reconstruction accuracy for the decoded images or video at the smallest number of bits. Methods for tackling stream adaptation in (ii), are the DASH and HLS protocols—namely, for the case of adaptive streaming over HTTP. Under adaptive streaming, the adaptation includes the selection of a number of encoding resolutions, bitrates and encoding templates (discussed previously). Therefore, the encoding and streaming process is bound to change the frequency content of the input video and introduce (ideally) imperceptible or (hopefully) controllable quality loss in return for bitrate savings. This quality loss is measured with a range or quality metrics, ranging from low-level signal-to-noise ratio metrics, all the way to complex mixtures of expert metrics that capture higher-level elements of human visual attention and perception. One such metric that is now well-recognized by the video community and the Video Quality Experts Group (VQEG) is the Video Multi-method Assessment Fusion (VMAF), proposed by Netflix. There has been a lot of work in VMAF to make it a "self-interpretable" metric: values close to 100 (e.g. 93 or higher) mean that the compressed content is visually indistinguishable from the original, while low values (e.g. below 70) mean that the compressed content has significant loss of quality in comparison to the original. It has been reported [Ozer, Streaming Media Mag., "Buyers' Guide to Video Quality Metrics", Mar. 29, 2019] that a difference of around 6 points in VMAF corresponds to the so-called Just-Noticeable Difference (JND), i.e. quality difference that will be noticed by the viewer.

The process of encoding and decoding (e.g. using a standard encoder/decoder) always requires the use of linear filters for the production of the decoded (and often upscaled) content that the viewer sees on their device. This can lead to uncontrolled quality fluctuation in video playback, or poor-quality video playback in general. The viewers most often experience this when they happen to be in an area with poor 4G/Wi-Fi signal strength, where the high-bitrate encoding of a 4K stream will quickly get switched to a much lower-bitrate/lower-resolution encoding, which the decoder and video player will keep on upscaling to the display device's resolution while the viewer continues watching.

Technical solutions to this problem can be grouped into three categories.

The first type of approaches consists of solutions attempting device-based enhancement, i.e. advancing the state-of-the-art in intelligent video post-processing at the video player when the content has been "crudely" downscaled using a linear filter such as the bicubic or variants of the Lanczos or other polyphaser filters [1]-[3], [10]-[20]. Several of these products are already in the market, including SoC solutions embedded within the latest 8K televisions. While there have been some advances in this domain [21]-[23], this category of solutions is limited by the stringent complexity constraints and power consumption limitations of consumer electronics. In addition, since the received content at the client is already distorted from the compression (quite often severely so), there are theoretical limits to the level of picture detail that can be recovered by client-side post-processing.

A second family of approaches consists of the development of bespoke image and video encoders, typically based on deep neural networks [10][12][1][13][14]. This deviates from encoding, stream-packaging and stream-transport standards and creates bespoke formats, so has the disadvantage of requiring bespoke transport mechanisms and bespoke decoders in the client devices. In addition, in the 50+ years video encoding has been developed most opportunities for improving gain in different situations have been taken, thereby making the current state-of-the-art in spatio-temporal prediction and encoding very difficult to outperform with neural-network solutions that are designed from scratch and learn from data.

The third family of methods comprises perceptual optimization of existing standards-based encoders by using perceptual metrics during encoding. Here, the challenges are that: i) the required tuning is severely constrained by the need for compliance to the utilized standard; ii) many of the proposed solutions tend to be limited to focus-of-attention models or shallow learning methods with limited capacity, e.g. assuming that the human gaze is focusing on particular areas of the frame (for instance, in a conversational video we tend to look at the speaker(s), not the background) or using some hand-crafted filters to enhance image slices or groups of image macroblocks prior to encoding; iii) such methods tend to require multiple encoding passes, thereby increasing complexity.

Because of these issues, known designs are very tightly coupled to the specific encoder implementation. Redesigning them for a new encoder and/or new standard, e.g., from HEVC to VP9 encoding, can require substantial effort.

The present disclosure seeks to solve or mitigate some or all of these above-mentioned problems. Alternatively and/or additionally, aspects of the present disclosure seek to provide improved image and video encoding and decoding methods, and in particular methods that can be used in combination with existing image and video codec frameworks.

SUMMARY

In accordance with a first aspect of the disclosure there is provided a computer-implemented method of configuring an image encoder emulator for use in image data processing, the method comprising: receiving input image data representing at least one image; encoding, at an encoding stage comprising a network of inter-connected weights, the input image data to generate encoded image data; decoding, at a decoding stage, the encoded image data to generate a first distorted version of the input image data; comparing the first distorted version of the input image data with a second distorted version of the input image data generated using an external image encoder to determine a distortion difference score; predicting, using a rate prediction model, an encoding bitrate associated with encoding the input image data to a quality corresponding to the first distorted version; determining a rate difference score by comparing the predicted encoding bitrate with an encoding bitrate used by the external encoder to encode the input image data to a quality corresponding to the second distorted version; and training the weights of the encoding stage based on the distortion difference score and the rate difference score.

As such, the image encoder emulator can be configured (or trained) to emulate the distortion effects produced by the external encoder, using sets of representative data. An image encoder emulator as described herein may comprise a function, model or process (which may be implemented using hardware and/or software) that emulates the behavior of an external image encoder, in particular the distortion effects produced by the external image encoder and the encoding bitrates associated with the external image encoder. By configuring the image encoder emulator in the above manner, i.e. by accurately estimating and emulating the incurred distortion and encoding rate of the external encoder, the external encoder itself is not required during subsequent deployment. Hence, the external encoder (which may, for example, be a third-party or standards-based encoder) may be used in an initial training phase to configure the image encoder emulator, after which the image encoder emulator may itself be used in place of the external encoder. Unlike the external encoder (which is typically a standards-based encoder), the image encoder emulator is trainable and bespoke, and so may be more readily tuned for particular applications and/or frameworks. The image encoder emulator may also be readily adapted or modified to emulate different encoders and/or encoder settings. Further, the external encoder may not be differentiable, and as such it may not be possible to back-propagate errors through the external encoder. This is in contrast with the trainable image encoder emulator, which is differentiable and allows for back-propagation of errors.

In embodiments, an output of the image encoder emulator is used to train an image preprocessing network configured to preprocess images prior to encoding the preprocessed images with an external image encoder. By configuring the image encoder emulator to accurately emulate the distortions (and data rate) associated with the external encoder, and subsequently using outputs of the image encoder emulator to train the preprocessing network, the design and/or operation of the preprocessing network can be optimized. That is, the performance of the preprocessing network (or "precoder") can be improved. In particular, this enables the preprocessing of the image data to be performed optimally in order to make the external encoder (which may be a standards-based encoder) operate as efficiently as possible. This may also enable a visual quality of subsequently encoded and decoded image data to be improved for a given encoding bitrate, and/or an encoding bitrate to achieve a given visual quality to be reduced. Fidelity of the subsequently encoded and decoded image data to the original image data may also be improved through use of the methods described herein.

By training the preprocessing network using outputs of the configured image encoder emulator, the representation space can be partitioned within a single model, reducing the need to train multiple models for every possible encoder setting, and reducing the need to redesign and/or reconfigure the preprocessing model for a new encoder and/or a new standard, e.g. from HEVC to VP9 encoding.

The described methods include technical solutions that are learnable based on data. An overall technical question addressed can be abstracted as: how to optimally preprocess (or "precode") the pixel stream of a video into a (typically) smaller pixel stream, in order to make standards-based encoders as efficient (and fast) as possible? This question may be especially relevant where the client device can upscale the content with its existing linear filters, and/or where perceptual quality is measured with the latest advances in perceptual quality metrics from the literature, e.g., using VMAF or similar metrics.

Advantageously, the weights of the encoding stage are trained using a back-propagation method to minimize the distortion difference score and/or the rate difference score. As such, the encoding stage can be configured so as to emulate the distortions and/or rate associated with the external encoder.

Preferably, the decoding stage comprises a set of inter-connected learnable weights, the method comprising training the weights of the decoding stage using a back-propagation method to minimize the distortion difference score and/or the rate difference score. As such, both the encoding stage and the decoding stage may comprise learnable weights which can be trained to emulate the distortion effects of the external encoder/decoder. In other words, the encoding stage and the decoding stage can be trained to emulate a 'standard' encoder/decoder. By training the decoding stage in a similar manner to the encoding stage, the external encoder/decoder is not required during subsequent deployment, and the image encoder emulator is made more flexible and bespoke. Further, the encoding and decoding stages are differentiable, unlike the external encoder/decoder. In embodiments, the architecture of the decoding stage mirrors that of the encoding stage. In alternative embodiments, the decoding stage has a different architecture to the encoding stage.

In embodiments, the encoding stage and the decoding stage each comprise a convolutional neural network having a U-Net architecture, where layers of the encoding stage are mirrored by layers of the decoding stage.

In embodiments, the rate prediction model comprises an artificial neural network configured to compress input features from the input image data into feature maps of smaller dimensions and combine the feature maps with a fully-connected neural network to predict the bitrate needed to compress the input image data. As such, the rate prediction model is trainable, and can be configured to accurately predict encoding bitrates associated with the external encoder.

In embodiments, the distortion difference score is obtained using a distance measure comprising one or more of: a mean absolute error, MAE, a mean squared error, MSE, a normalized MAE, and a normalized MSE.

In embodiments, the input image data represents a sequence of images, the method comprising using features from neighboring images in the sequence of images to generate the first distorted version and/or the predicted encoding bitrate. This may improve an accuracy of estimating distortions and/or rates compared to a case in which features from neighboring images are not used.

In embodiments, the comparing the first distorted version of the input image data with the second distorted version of the input image data is performed using a learnable discrimination model that is configured to distinguish between distortions generated via the encoding stage and the decoding stage, and ground truth distortions produced using the external encoder.

In embodiments, the weights of the encoding stage and the discrimination model are trained sequentially, in a series of iterations.

In embodiments, a distortion map is generated, comprising, for each of a plurality of spatial regions in the first distorted version of the input image data, a distinguishability measure indicating a confidence level in the fidelity of observed distortions in the first distorted version to learned features derived from the ground truth distortions. The distortion difference score is determined using the distortion map. This may improve an accuracy and/or reliability in estimating and/or assessing distortion effects.

In embodiments, distortions in the first distorted version of the input image data are quantified using an image quality score comprising one or more of: peak-signal-to-noise ratio, structural similarity index, SSIM, multiscale quality metrics such as a detail loss metric or multiscale SSIM, metrics based on multiple quality scores and data-driven learning and training, such as a video multi-method assessment fusion, VMAF, and aesthetic quality metrics.

In embodiments, the external encoder comprises a standards-based image encoder such as an ISO JPEG or ISO MPEG encoder, or a proprietary or royalty-free encoder, such an AOMedia encoder. In embodiments, the external encoder is a non-standard encoder (e.g. operating according to a non-standard codec). Methods described herein enable the behavior of such an external encoder to be learned and emulated, so that the external encoder itself is not required during deployment.

In accordance with another aspect of the disclosure, there is provided a computer-implemented method of generating image or video distortions (called "generative method") that are emulating those imposed in the specific image or video when they are processed by an external (or "third party") image or video encoder. The generation method is based on an encoding stage, where the input image or video is encoded into a lower-dimensional representation (also known as a latent code) and a decoding stage, where the latent code, or a set of multiple latent codes generated from the input image or video, is mapped into a space of equal dimensionality to the input to represent a distorted version of the input. The produced distortions are evaluated via a "distortion assessment" method, which uses actual encodings of the input image or video from third-party image/video encoders that introduce distortion and assesses the similarity of the distortions produced by the generative method to those of the third-party encoder using a similarity score. The method for encoding and decoding for generative distortion is typically implemented via one or more convolutional neural networks, the parameters of which are trained with back-propagation methods in order to maximize the similarity score of the distortion assessment method. The encoding and decoding for distortion generation via such convolutional neural networks can comprise, but are not limited to, a "U-Net" architecture [19], where layers of the encoding are mirrored in layers of the decoding. The "generative method" and the "distortion assessment" method are trained sequentially one after the other, in a series of iterations.

In embodiments, the "distortion assessment" method uses one or a combination of the following two measures as the similarity score: (i) a learnable discrimination model that distinguishes generated distortions from real distortions using a neural network distortion classifier; (ii) a distance measure between the generated images, $x_g$, and the decoded images, $x_e$, that includes one or more of: the mean absolute error (MAE), the mean squared error (MSE), normalized versions of the MAE or MSE. Distortion measures or scores can be grouped into distortion maps for areas of the input image or video that express the confidence of the "distortion assessment" method against known ground-truth distortions. These maps can be assessed manually or numerically via an algorithm that generates average scores for different areas of images or video, expressing if distortions are visually annoying and if human viewers find them visually similar to the ones produced by ground-truth results with external image or video encoders.

In embodiments, the provided distortions are coupled with a rate prediction model, which predicts the encoding bitrate in bits-per-second or bits-per-pixel to encode the input image or video to the estimated distortion when using an external image or video encoder. The rate prediction model is a neural network that gradually compresses input features produced from the input image or video into feature maps of smaller dimensions until the last layer of the system, where the learned features are combined with a fully-connected neural network to predict the bitrate needed to compress the input image or video. Groups of images can be used to improve the distortion and rate estimation by using the features extracted from neighboring frames. In addition, the input can be downscaled or upscaled using a linear or non-linear filter, or a learnable method based on data and back-propagation based training with gradient descent methods.

In embodiments, the external encoder that generates distortion during actual encoding and decoding can be a standards-based image or video encoder such as an ISO JPEG or ISO MPEG standard encoder, or a proprietary or royalty-free encoder, such as, but not limited to, an AOMedia encoder.

In embodiments, the derived distortion and rate model is combined with an image preprocessing method that is enhancing the input according to distortion or perceptual optimization prior to actual encoding. In embodiments, the distortion is quantified by one or more of the following objective, perceptual or aesthetic image quality scores: peak-signal-to-noise ratio, structural similarity index metric (SSIM), multiscale quality metrics such as the detail loss metric or multiscale SSIM, metrics based on multiple quality scores and data-driven learning and training, such as the video multi-method assessment fusion (VMAF), or aesthetic quality metrics, such as those described by Deng, Y., Loy, C. C. and Tang, X., in their article: "Image aesthetic assessment: An experimental survey". IEEE Signal Processing Magazine, 34(4), pp. 80-106, 2017" and variations of those metrics.

In embodiments, the input data may be video data, one or more images or frames of video, and the encoder modelled and used can be an image codec a video codec.

In embodiments, the external encoder comprises an image codec. In embodiments, the image data comprises video data and the one or more images comprise frames of video. In embodiments, the external encoder comprises a video codec.

The methods of processing image data described herein may be performed on a batch of video data, e.g. a complete video file for a movie or the like, or on a stream of video data.

In accordance with another aspect of the disclosure there is provided a computing device comprising: a processor; and a memory, wherein the computing device is arranged to perform using the processor any of the methods described above.

In accordance with another aspect of the disclosure there is provided a computer program product arranged, when executed on a computing device comprising a process or memory, to perform any of the methods described above.

It will of course be appreciated that features described in relation to one aspect of the present disclosure described above may be incorporated into other aspects of the present disclosure.

DESCRIPTION OF THE DRAWINGS

Embodiments of the present disclosure will now be described by way of example only with reference to the accompanying schematic drawings of which:

FIGS. 2(a) to 2(c) are schematic diagrams showing a preprocessing network in accordance with embodiments;

FIG. 7 is a table showing distortion and rate estimates in accordance with embodiments;

DETAILED DESCRIPTION

Embodiments of the present disclosure are now described.

Figure 1:
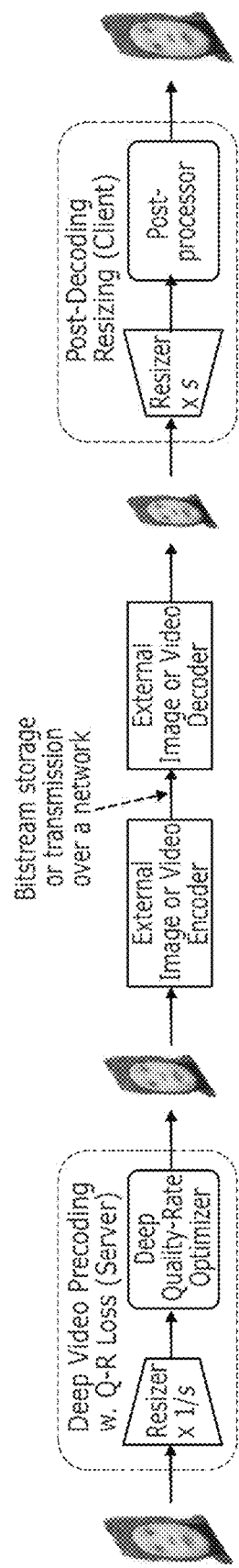
FIG. 1 is a schematic diagram showing a method of processing image data in accordance with embodiments.

FIG. 1 is a schematic diagram showing a method of processing image data, according to embodiments. In particular, FIG. 1 shows the components of an image or video precoding (or 'preprocessing') system, followed by standard encoding and decoding with a third-party (external) encoder and decoder. Embodiments are applicable to batch processing, i.e. processing a group of images or video frames together without delay constraints (e.g., an entire video sequence), as well as to stream processing, i.e. processing only a limited subset of a stream of images or video frames, or even a select subset of a single image, e.g. due to delay or buffering constraints.

The precoder can be a deep video precoding system [18] with quality-rate loss (shown as 'Q-R loss' in the leftmost box of FIG. 1). This precoding typically consists of a resizer and a deep quality-rate optimizer component. The resizer can downscale or upscale the input using a non-linear filter, or an artificial neural network. The effect of the resizer is inverted at the post-decoding resizing component on the right-hand side of FIG. 1 and the recovered pixel groups can form a recovered image of the original resolution to be displayed to a viewer after an optional post-processing component, which can be a linear or non-linear filter or an artificial neural network that enhances aesthetic or perceptual aspects of the recovered image. In-between the output of the deep video precoding with Q-R loss and the decoder, an external image or video encoder is used, which may comprise any ISO PEG or ISO MPEG, or AOMedia encoder or other proprietary encoder. In addition, as shown in FIG. 1, the produced bitstream from the encoder can be stored or transmitted over a network to the corresponding decoder.

Figure 2C:
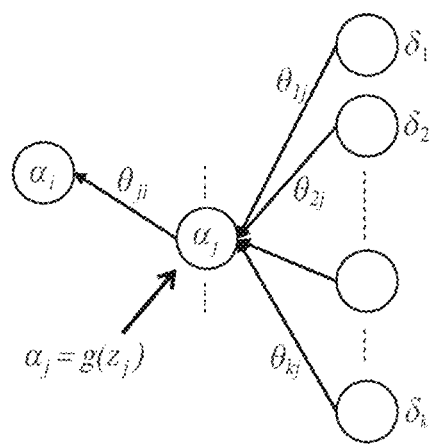

The deep quality-rate optimizer (DQRO) shown in FIG. 1 comprises any combination of weights connected in a network and having a non-linear function (akin to an activation function of an artificial neural network). An example of such weights is shown in FIG. 2(a), which depicts a combination of inputs $x_0, \ldots, x_3$ with weight coefficients $\theta$ and non-linear activation function g( ). The trained embodiments of DQRO instantiations comprise multiple layers of weights and activation functions. An example of the connectivity between weights and inputs is shown in FIG. 2(b), which depicts schematically layers of interconnected weights, forming an artificial neural network. Such embodiments are trained with back-propagation of errors computed at the output layer, using gradient descent methods, as shown in the embodiment of FIG. 2(c). In particular, FIG. 2(c) shows diagram of back-propagation of errors from an intermediate layer (right side of FIG. 2(c)) to the previous intermediate layer using gradient descent.

Figure 3:
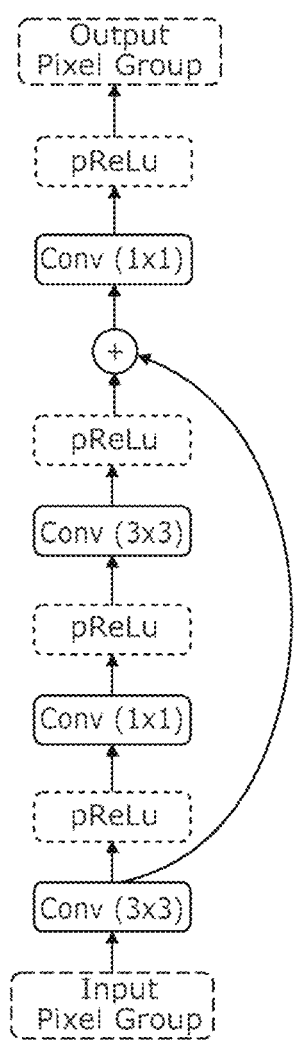
FIG. 3 is a schematic diagram showing a preprocessing network in accordance with embodiments.

An example of a trainable component of DQRO is shown in FIG. 3. It consists of a cascade of convolutional (Cony (k×k)) and parametric ReLu (pReLu) layers of weights and activation functions mapping input pixel groups to transformed output pixel groups, e.g. as described with reference to FIG. 2(b). Convolutional layers extend the embodiment in FIG. 2(b) to multiple dimensions, by performing convolution operations between multi-dimensional filters of fixed kernel size (k×k) with learnable weights and the inputs to the layer. Each activation in the output of the convolutional layer only has local (not global) connectivity to a local region of the input. The connectivity of the cascade of convolutional layers and activation functions can also include skip connections, as shown by the connection from the output of the leftmost "Cony (3×3)" layer of FIG. 3 to the summation point of FIG. 3. In addition, the entirety of the cascade of multiple layers (also known as a deep neural network) is trainable end-to-end based on back-propagation of errors from the output layer backwards (e.g. as shown in FIG. 2(c)), using gradient descent methods.

Figure 4:
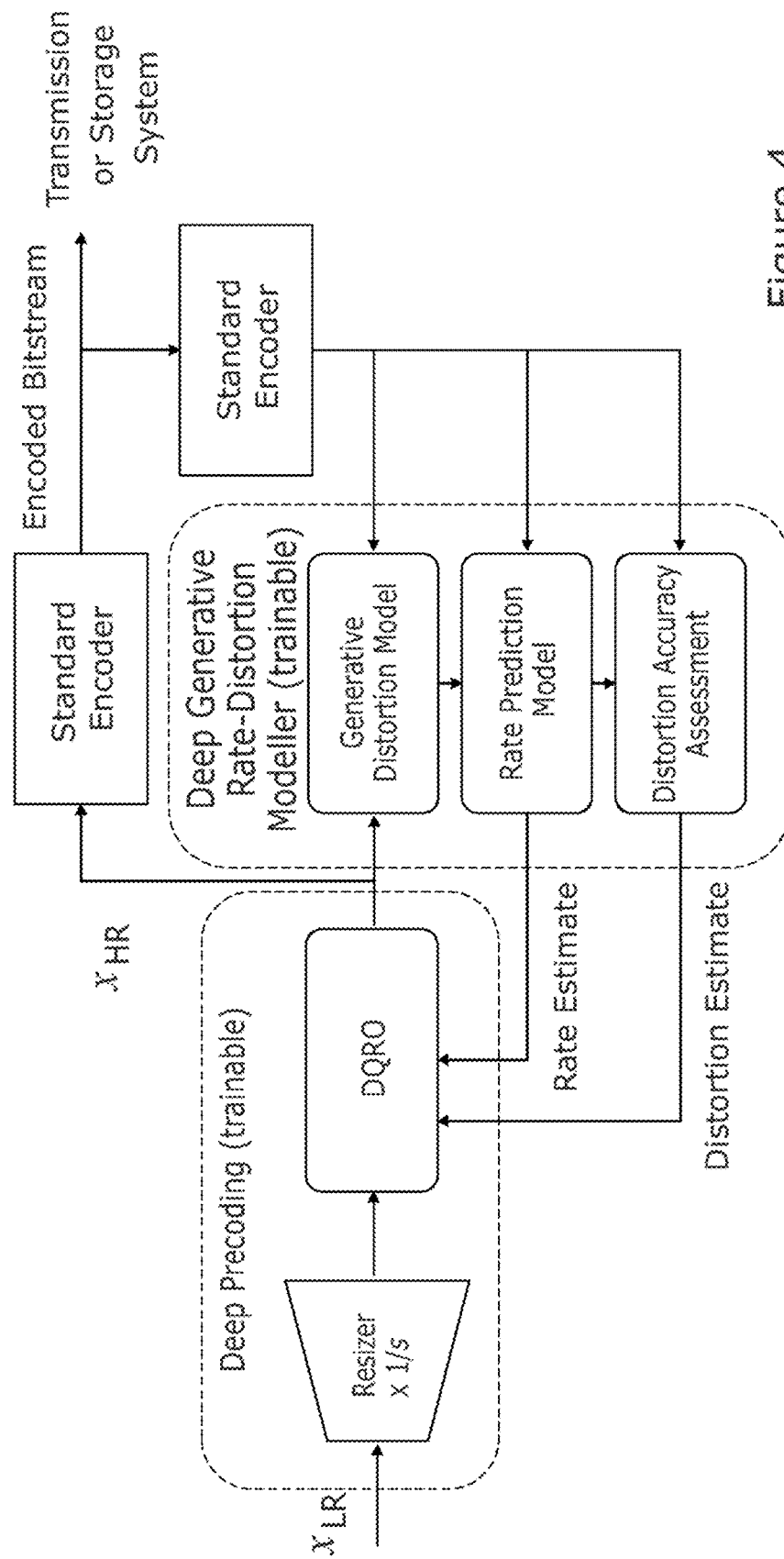
FIG. 4 is a schematic diagram showing a training process in accordance with embodiments.

In order to optimize the design of the DQRO according to rate and distortion induced by an external video encoder, a deep generative rate-distortion modeler (DGRDM) is designed and deployed as a system. An example of the interaction between the DGRDM and the DQRO is shown in FIG. 4, where it is emphasized that both systems are trainable based on data. As such, FIG. 4 is a schematic diagram showing iterative training of the deep precoding model and the deep generative rate-distortion model. The terms "Standard Encoder" and "Standard Decoder" used in FIG. 4 refer to any external (third-party) encoder/decoder, the implementation details of which may not be known, but they can be used as black boxes. The training can happen in a number of iterations, e.g. where the DQRO is trained with the weights and instantiation of DGRDM being frozen, and vice-versa. The remainder of the detailed description focuses on the training and use of the DGRDM, as well as its interaction with the DQRO.

Figure 5:
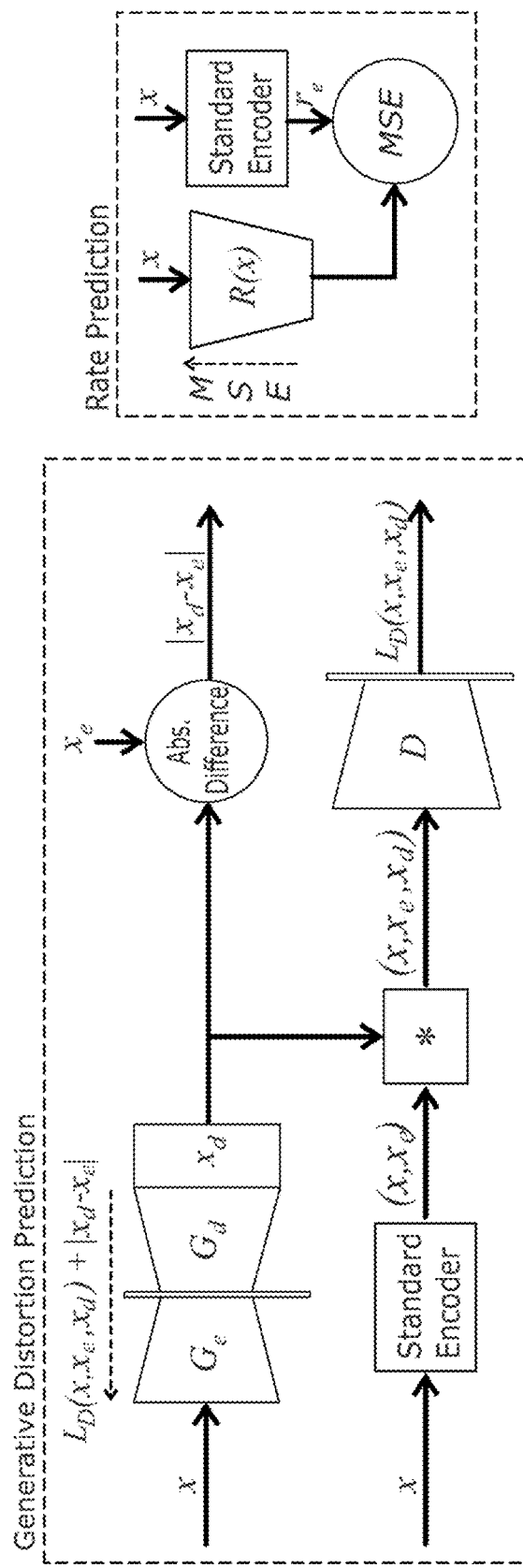
FIG. 5 is a schematic diagram showing a training process in accordance with embodiments.

An example illustration of the framework for training the DGRDM is shown in FIG. 5. That is, FIG. 5 is a schematic diagram detailing the training process of a generative rate-distortion model. The generative rate-distortion and rate prediction models are trained separately, where both are blind to all operations occurring outside the dashed lines. Dashed lines indicate loss signals used for training different components of the rate-distortion model. The fidelity of generated distortion predictions $x_d$ is measured by a discrimination mod& $D(x, x_d, x_e)$ and an added absolute error term $|x_d-x_e|$.

The generative model predicts codec distortions as learned directly from sets of representative data, and is complementary to the training process of the DQRO. That is, the generative rate-distortion model is trained separately, and is agnostic to all training operations of the DQRO. Training the generative rate-distortion model comprises multiple components, which will now be described with reference to FIG. 5.

The generative model comprises two stages: (i) an encoding stage, where input images x, are mapped onto a low-dimensional space as latent codes z, and (ii) a decoding stage, where latent codes are mapped hack to a space of equal dimensionality to that of x, to represent distorted frames $x_d$ after predicted codec distortions are applied. Produced distortion predictions are then evaluated by a complementary distortion accuracy assessment model, which uses actual video codecs to produce frame encodings $x_c$ that represent ground truths of frame distortions (i.e. predictions are considered entirely accurate wherever $x_d=x_e$). FIG. 5 provides an overview of an example architecture which may be used for predicting $x_d$, where encoding and decoding are respectively implemented as convolutional and deconvolutional architectures. The generative model adopts a U-Net architecture, where feature maps of layers preceding the latent code z are mirrored into counterpart layers occurring after the latent code z. In other words, when the total number of layers is N, the output of each $i^{th}$ layer is additionally forwarded to the $(N-i)^{th}$ layer as input. Alternatively, the same architecture can be used without skip connections between layers, where this can be done to trade-off the accuracy of generated distortions for reduced complexity of generation.

A distortion accuracy assessment function is used to evaluate predicted codec distortions. In embodiments, predicted codec distortions are evaluated with two measures, where: (i the first measure is provided by a learnable discrimination model that attempts to distinguish generated distortions $x_d$ from ground truth distortions $x_e$ as produced from a specified video coding standard (e.g., AVC/H264, HEVC, or VP9), and (ii) the second measure is calculated as the mean absolute distance $|x_d-x_e|$ between generated frames $x_d$ and ground truth frames $x_e$ that include distortions as produced by a specified video coder. The measures of (i) and (ii) are then translated to a training signal to use for training the generative model. Similar to the generative model $G(x)$, the discrimination model $D(x, x_d, x_e)$ is implemented using a convolutional neural network architecture. The discrimination model produces two-dimensional maps $L_D(x, x_d, x_e)$ that describe the likelihood of generated distortions being sampled from the output of a standard video coder. The two-dimensional maps of $L_D(x, x_d, x_e)$ produce a distinguishability measure for each local spatial region of generated frames $x_d$. That is, in each respective local region, points in two-dimensional maps express the confidence of the model in the fidelity of the observed distortions to learned features from distortion ground truths. By increasing the dimensions of output maps, higher frequencies of input distortions can be assessed. The confidence map is then averaged to yield the overall confidence score of the distortion assessment model in deciding whether or not observed distortions were generated. The overall confidence measure is subsequently combined with an L1 loss between ground truth distortions (from $x_e$) and generated distortions (from $x_d$).

The generative model and distortion assessment models are trained sequentially, where each step of training iterates between updating the weights of each model. Optionally, the ratio of steps dedicated to training each model can be tuned such that the generative model receives more weight updates than the distortion assessment model. The latter option can be used to ensure the generative model exhaustively learns to surpass the knowledge of the distortion assessment model. It should also be noted that all components of the learnable rate-distortion model may be fully trained before training the precoder (DQRO) embodiment.

The example rate prediction model R(x) shown in FIG. 5 predicts coding rates directly from input frames (x). Rate predictions are produced as outputs of a learnable mod& trained via a signal that measures the Mean Square Error (MSE) between predicted rates and ground truth rates returned by a specified video encoder (e.g., AVC/H264 or HEM. The rate prediction model is implemented as a convolutional neural network architecture to gradually compress layer feature maps until the last layer, where learned features are combined with a multi-layer-perceptron to predict a scalar value approximating the bitrate required for compressing input frames. Optionally, the input of the rate prediction model can take in full groups-of-frames (GoP) to improve rate predictions by assessing both the spatial features in each frame and the spatial features included in neighboring frames (which are commonly used for inter-prediction in the block models of ubiquitous video codecs). The rate prediction mod& is trained separately from the generative and distortion assessment models.

Figure 6:
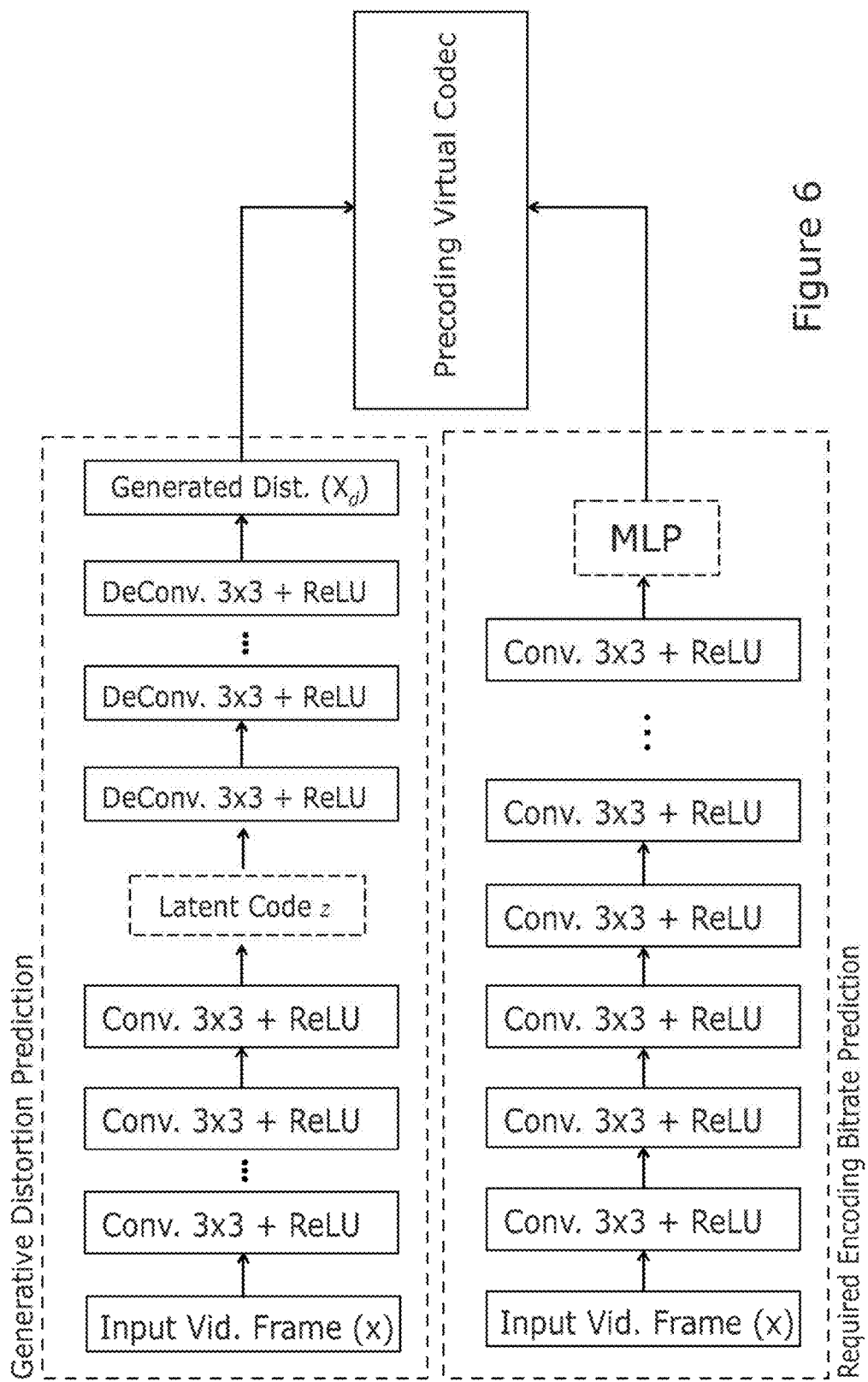
FIG. 6 is a schematic diagram showing a learnable rate-distortion model in accordance with embodiments.

FIG. 6 is a schematic diagram showing the learnable rate-distortion model useable for training the precoder of FIG. 4. FIG. 6 also shows an example of the convolutional architecture used for rate prediction. The discriminator is excluded when generating distortions for a given precoding training environment, and only the components needed for producing $x_d$ are retained. Dashed lines indicate the architecture of the generative distortion model and rate prediction model. Deconvolutional layers of the generative model increase the dimensions of output feature maps, until eventually their outputs reach the appropriate dimensions of $x_d$ (which are equal to the height and width of inputs x). Note that the rates produced by the rate prediction model are eventually used to calculate the precoding rate loss of the precoder. The components described previously serve to predict image or video codec distortions in a differentiable manner.

To test the methods described herein, i.e. by emulating distortion effects from encoding, a generative model was used with a composite loss function. One component of this composite loss function is a discriminatory loss function calculated on local spatial neighborhoods. That is, a separate discrimination loss was produced for each local region of generated frames. To capture low frequencies of distortions, an L1 loss was used, while SSIM and a combined L1+SSIM loss have also been evaluated. Concerning the rate model, an MSE loss was used for training the rate prediction model, which provided for an average at 10% in relative rate estimation error. For the generative model, a U-Net architecture [19] was used, where skip connections are added to later layers. This type of architecture was shown to work well for style transfer, and is amongst the best performing architecture.

A curated version of the "Kinetics-720p" dataset was used for training, in some embodiments. Validation took place on a subset of the XIPH-1080p sequence dataset, so there is a notable domain shift in testing. Under this setup, indicative distortion and rate estimation results for the HEVC encoder (under its x265 implementation) are shown in FIG. 7. In particular, VMAF distortion metric and rate estimation relative error are shown for HEVC encoding (under its x265 implementation) with: "medium" encoding preset, various CRF values, various RPS modes (0=intra, 1=inter prediction with 1 reference frame), and various input modes for the deep generative RD modeler. The results validate that, not only the relative rate estimation error is in the vicinity of 10%, but the VMAF distortion estimation is within 1.5-2 points for the entire range of configurations tested. Beyond the presented embodiments, the methods described herein can be realized with the full range of options and adaptivity described in the previous examples, and al such options and their adaptations are covered by this disclosure.

Figure 8:
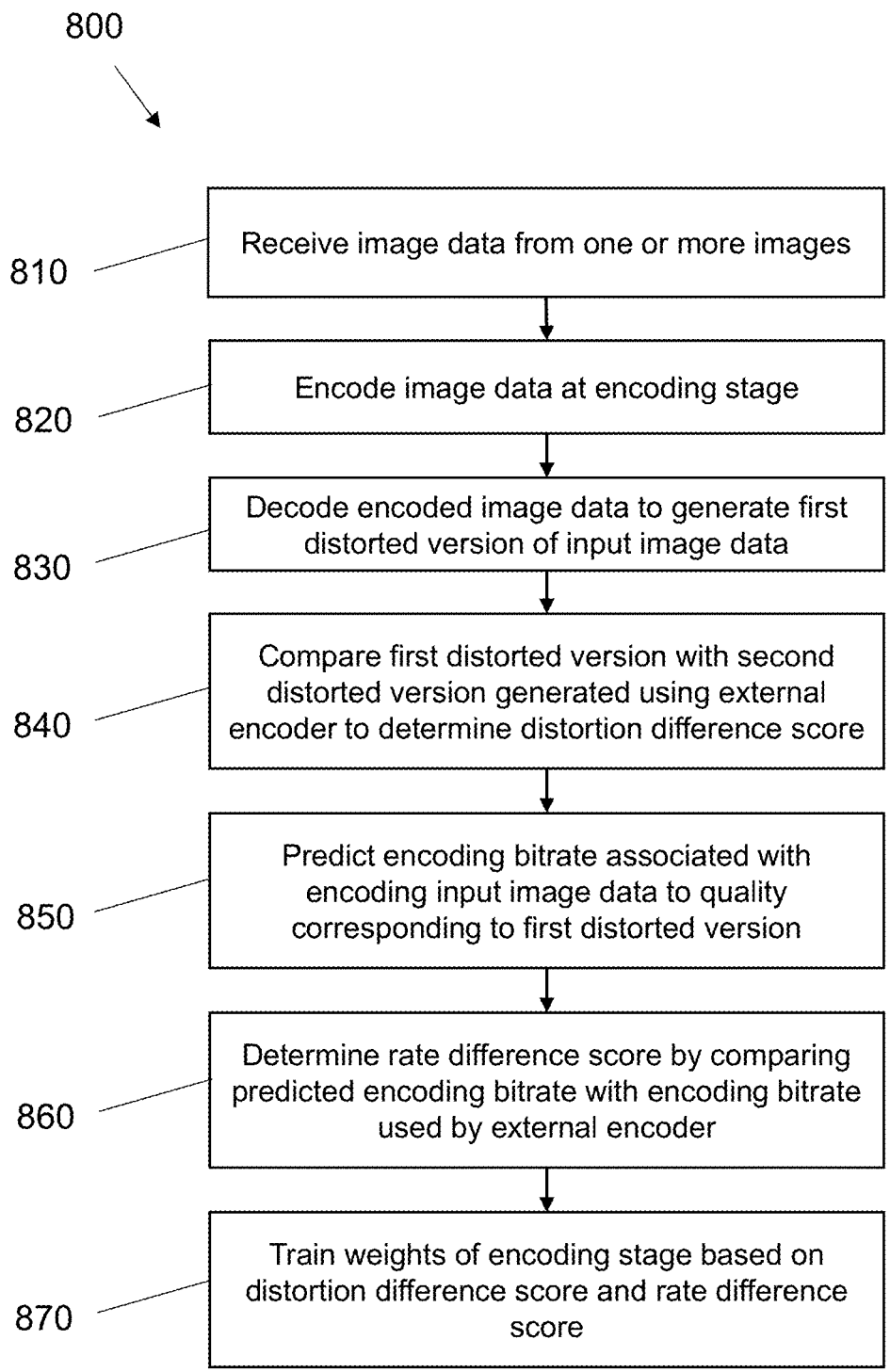
FIG. 8 is a flowchart showing the steps of a method in accordance with embodiments.

FIG. 8 shows a method 800 for configuring an image encoder emulator for use in image data processing. The method 800 may be performed by a computing device, according to embodiments. The method 800 may be performed at least in part by hardware and/or software. At item 810, input image data representing at least one image is received. At item 820, the input image data is encoded at an encoding stage comprising a network of inter-connected weights to generate encoded image data. At item 830, the encoded image data is decoded at a decoding stage to generate a first distorted version of the input image data. At item 840, the first distorted version of the input image data is compared with a second distorted version of the input image data generated using an external image encoder (and a decoder) to determine a distortion difference score. At item 850, an encoding bitrate associated with encoding the input image data to a quality corresponding to the first distorted version is predicted, using a rate prediction model. At item 860, a rate difference score is determined by comparing the predicted encoding bitrate with an encoding bitrate used by the external encoder to encode the input image data to a quality corresponding to the second distorted version. At item 870, the weights of the encoding stage are trained (e.g. optimized) based on the distortion difference score and the rate difference score.

In embodiments, the method 800 comprises using an output of the (configured) image encoder emulator to train an image preprocessing network configured to preprocess images prior to encoding the preprocessed images with an external image encoder. In embodiments, the method 800 additionally comprises using the trained preprocessing network to preprocess images prior to encoding with the external image encoder. In embodiments, the method 800 comprises encoding the preprocessed images with the external image encoder. The encoded images may be transmitted, for example to a client device for decoding and subsequent display.

Figure 9:
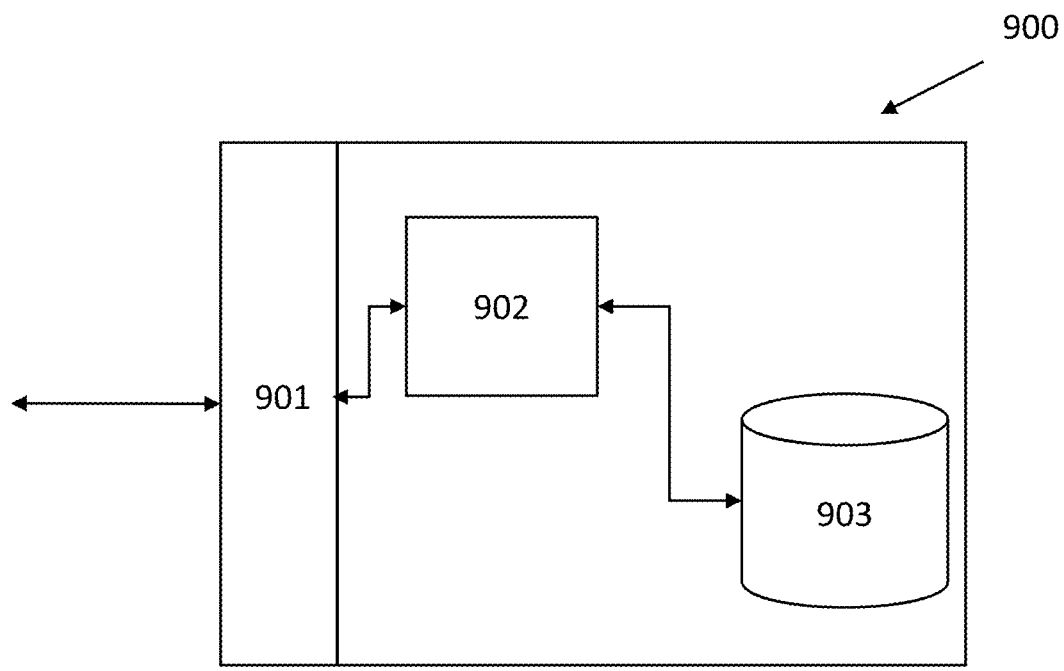
FIG. 9 is a schematic diagram of a computing device in accordance with embodiments.

Embodiments of the disclosure include the methods described above performed on a computing device, such as the computing device 900 shown in FIG. 9. The computing device 900 comprises a data interface 901, through which data can be sent or received, for example over a network. The computing device 900 further comprises a processor 902 in communication with the data interface 901, and memory 903 in communication with the processor 902. In this way, the computing device 900 can receive data, such as image data or video data, via the data interface 901, and the processor 902 can store the received data in the memory 903, and process it so as to perform the methods of described herein, including configuring an image encoder emulator, using the configured image encoder emulator to train a preprocessing network for preprocessing image data prior to encoding using an external encoder, preprocessing image data using the preprocessing network, and optionally encoding the preprocessed image data.

Each device, module, component, machine or function as described in relation to any of the examples described herein may comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Various measures (including methods, apparatus, computing devices and computer program products) are provided for generating image or video distortions (called "generative method"), with these distortions resembling those imposed in the specific image or video when they are processed by an external image or video encoder. The generation method uses the following five steps: (i) an encoding stage, where the input image or video is encoded into a lower-dimensional representation, also known as a latent code; (ii) a decoding stage, where the latent code, or a set of multiple latent codes generated from the input image or video, is mapped into a space of equal dimensionality to the input to represent a distorted version of the input image or video; (iii) the distorted version of the input image or video is coupled with a rate prediction model that estimates the encoding bitrate in bits-per-second or bits-per-pixel to encode the input image or video to the quality that corresponds to the distorted version when using an external image or video encoder, with the rate prediction model comprising a neural network that gradually compresses input features produced from the input image or video into feature maps of smaller dimensions until the last layer of the system and the learned features are combined with a fully-connected neural network to predict the bitrate needed to compress the input image or video; (iv) the measurement of rate and distortion difference between the cascade of steps (i) and (ii) versus the rate and distortion of an external image or video encoder processing the same image or video, where the rate is measured in bits-per-pixel or bits-per-second and distortion is measured using multiple computer-implemented methods that can optionally include perceptual quality metrics measuring visual quality as assessed by human viewers. Back-propagation of the rate and distortion difference from step (iii) is performed and the weights of the encoding and decoding stages of steps (i) and (ii) adjusted based on gradient descend methods.

In embodiments, the generative method is combined with an image or video pre-processor or precoder system that uses the rate and distortion estimates in order to improve the signal quality or perceptual quality of the input images or video prior to the actual encoding of these by an external image or video encoder.

In embodiments, the encoding and decoding stages comprise one or more convolutional neural networks, the parameters of which are trained with back-propagation methods in order to maximize the similarity score.

In embodiments, the convolutional neural network uses a "U-Net" neural network architecture, where layers of the encoding stage are mirrored in layers of the decoding stage.

In embodiments, the generative method and rate estimation method of steps (i)-(iii) and the rate and distortion difference measurement method of step (iv) are trained sequentially one after the other, in a series of iterations.

In embodiments, the rate and distortion difference measurement of step (iv) is using a distance measure between the generated images from steps (i) and (ii) and the decoded images from an external image or video encoding and decoding system that includes one or more of: the mean absolute error (MAE), the mean squared error (MSE), normalized versions of the MAE or MSE.

In embodiments, distortion maps are generated for areas of the input image or video that express the confidence of the distortion assessment method against known ground-truth distortions; the distortion maps can be assessed manually, or can be numerically processed to generate average scores for different areas of images or video, expressing if distortions are visually annoying and if human viewers find them visually similar to the ones produced by ground-truth results with external image or video encoders.

In embodiments, groups of images are used to improve the distortion and rate estimation by using the features extracted from neighboring frames.

In embodiments, the input is downscaled or upscaled using a linear or non-linear filter, or a learnable method based on data and back-propagation based training with gradient descent methods.

In embodiments, the utilized encoder is a standards-based image or video encoder such as an ISO JPEG or ISO MPEG standard encoder, or a proprietary or royalty-free encoder, such as, but not limited to, an AOMedia encoder.

In embodiments, the generative method is combined with an image preprocessing method that is enhancing the input according to distortion or perceptual optimization prior to actual encoding.

In embodiments, the distortion is quantified by one or more of the following objective, perceptual or aesthetic image quality scores: peak-signal-to-noise ratio, structural similarity index metric (SSIM), multiscale quality metrics such as the detail loss metric or multiscale SSIM, metrics based on multiple quality scores and data-driven learning and training, such as the video multi-method assessment fusion (VMAF), or aesthetic quality metrics, such as those described by Deng, Y., Loy, C. C. and Tang, X., in their article: "Image aesthetic assessment: An experimental survey". IEEE Signal Processing Magazine, 34(4), pp. 80-106, 2017" and variations of those metrics.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

REFERENCES

[1] Dong, Jie, and Yan Ye. "Adaptive downsampling for high-definition video coding." IEEE Transactions on Circuits and Systems for Video Technology 24.3 (2014): 480-488.

[2] Douma, Peter, and Motoyuki Koike. "Method and apparatus for video upscaling." U.S. Pat. No. 8,165,197. 24 Apr. 2012.

[3] Su, Guan-Ming, et al. "Guided image up-sampling in video coding." U.S. Pat. No. 9,100,660. 4 Aug. 2015.

[4] Shen, Minmin, Ping Xue, and Ci Wang. "Downsampling based video coding using super-resolution technique." IEEE Transactions on Circuits and Systems for Video Technology21.6 (2011): 755-765.

[5] van der Schaar, Mihaela, and Mahesh Balakrishnan. "Spatial scalability for fine granular video encoding." U.S. Pat. No. 6,836,512. 28 Dec. 2004.

[6] Boyce, Jill, et al. "Techniques for layered video encoding and decoding." U.S. patent application Ser. No. 13/738,138.

[7] Dar, Yehuda, and Alfred M. Bruckstein. "Improving low bit-rate video coding using spatio-temporal down-scaling." arXiv preprint arXiv:1404.4026 (2014).

[8] Martemyanov, Alexey, et al. "Real-time video coding/decoding." U.S. Pat. No. 7,336,720. 26 Feb. 2008.

[9] Nguyen, Viet-Anh, Yap-Peng Tan, and Weisi Lin. "Adaptive downsampling/upsampling for better video compression at low bit rate." Circuits and Systems, 2008. ISCAS 2008. IEEE International Symposium on. IEEE, 2008.

[10] Hinton, Geoffrey E., and Ruslan R. Salakhutdinov. "Reducing the dimensionality of data with neural networks." science313.5786 (2006): 504-507.

[11] van den Oord, Aaron, et al. "Conditional image generation with pixelcnn decoders." Advances in Neural Information Processing Systems. 2016.

[12] Theis, Lucas, et al. "Lossy image compression with compressive autoencoders." arXiv preprint arXiv: 1703.00395(2017).

[13] Wu, Chao-Yuan, Nayan Singhal, and Philipp Krähenbühl. "Video Compression through Image Interpolation." arXiv preprint arXiv:1804.06919 (2018).

[14] Rippel, Oren, and Lubomir Bourdev. "Real-time adaptive image compression." arXiv preprint arXiv: 1705.05823 (2017).

[15] Wang, Shiqi, et al. "SSIM-motivated rate-distortion optimization for video coding." IEEE Transactions on Circuits and Systems for Video Technology 22.4 (2011): 516-529.

[16] Li, Chenglin, et al. "Delay-power-rate-distortion optimization of video representations for dynamic adaptive streaming." IEEE Transactions on Circuits and Systems for Video Technology 28.7 (2017): 1648-1664.

[17] Helmrich, Christian, et al. "Perceptually Optimized Bit-Allocation and Associated Distortion Measure for Block-Based Image or Video Coding." 2019 Data Compression Conference (DCC). IEEE, 2019.

[18] Xu, Bin, et al. "CNN-based rate-distortion modeling for H. 265/HEVC." 2017 IEEE Visual Communications and Image Processing (VCIP). IEEE, 2017.

[19] Zhu, Shiping, and Ziyao Xu. "Spatiotemporal visual saliency guided perceptual high efficiency video coding with neural network." Neurocomputing 275 (2018): 511-522.

[20] E. Bourtsoulatze, A. Chadha, I. Fadeev, V. Giotsas, Y. Andreopoulos, "Deep video precoding," IEEE Trans. on Circ. and Syst. for Video Technol., to appear in 2020.

[21] O. Ronneberger, P. Fischer, and T. Brox, "U-net: Convolutional networks for biomedical image segmentation," International Conference on Medical image computing and computer-assisted intervention. Springer, Cham, 2015.

[22] Golub, Gene H., and Charles F. Van Loan. Matrix computations. Vol. 3. JHU Press, 2012.

[23] Deng, Y., Loy, C. C. and Tang, X., "Image aesthetic assessment: An experimental survey," IEEE Signal Processing Magazine, 34(4), pp. 80-106, 2017".

What is claimed is:

1. A computer-implemented method of configuring an image encoder emulator for use in image data processing, the method comprising:
   receiving input image data representing at least one image;
   encoding, at an encoding stage of the image encoder emulator, the input image data to generate encoded image data, the encoding stage comprising a network of inter-connected weights;
   decoding, at a decoding stage of the image encoder emulator, the encoded image data to generate a first distorted version of the input image data;
   receiving a second distorted version of the input image data generated using an external image encoder;
   comparing the first distorted version of the input image data with the second distorted version of the input image data to determine a distortion difference score;
   predicting, using a rate prediction model, a first encoding bitrate associated with encoding the input image data to a quality corresponding to the first distorted version;
   receiving a second encoding bitrate used by the external encoder to encode the input image data to a quality corresponding to the second distorted version;
   determining a rate difference score by comparing the predicted encoding bitrate with the received second encoding bitrate used by the external encoder to encode the input image data to a quality corresponding to the second distorted version; and
   training the weights of the encoding stage based on the distortion difference score and the rate difference score, thereby to configure the image encoder emulator to emulate behavior of the external image encoder.

2. The method of claim 1, further comprising using an output of the image encoder emulator to train an image preprocessing network configured to preprocess images prior to encoding the preprocessed images with an external image encoder.

3. The method of claim 1, further comprising training the weights of the encoding stage using a back-propagation method to minimize the distortion difference score and/or the rate difference score.

4. The method of claim 1, wherein the decoding stage comprises a set of inter-connected learnable weights, the method comprising training the weights of the decoding stage using a back-propagation method to minimize the distortion difference score and/or the rate difference score.

5. The method of claim 1, wherein the encoding stage and the decoding stage each comprise a convolutional neural network having a U-Net architecture, where layers of the encoding stage are mirrored by layers of the decoding stage.

6. The method of claim 1, wherein the rate prediction model comprises an artificial neural network configured to compress input features from the input image data into feature maps of smaller dimensions and combine the feature maps with a fully-connected neural network to predict the bitrate needed to compress the input image data.

7. The method of claim 1, wherein the distortion difference score is obtained using a distance measure comprising one or more of: a mean absolute error, MAE, a mean squared error, MSE, a normalized MAE, and a normalized MSE.

8. The method of claim 1, wherein the input image data represents a sequence of images, the method comprising using features from neighboring images in the sequence of images to generate the first distorted version and/or the predicted encoding bitrate.

9. The method of claim 1, wherein the comparing the first distorted version of the input image data with the second distorted version of the input image data is performed using a learnable discrimination model that is configured to distinguish between distortions generated via the encoding stage and the decoding stage, and ground truth distortions produced using the external encoder.

10. The method of claim 9, further comprising training the weights of the encoding stage and the discrimination model sequentially, in a series of iterations.

11. The method of claim 1, further comprising:
   generating a distortion map comprising, for each of a plurality of spatial regions in the first distorted version of the input image data, a distinguishability measure indicating a confidence level in a fidelity of observed distortions in the first distorted version to learned features derived from ground truth distortions; and
   determining the distortion difference score using the distortion map.

12. The method of claim 1, further comprising quantifying distortions in the first distorted version of the input image data using an image quality score comprising one or more of: peak-signal-to-noise ratio, structural similarity index, SSIM, multiscale quality metrics such as a detail loss metric or multiscale SSIM, metrics based on multiple quality scores and data-driven learning and training, such as a video multi-method assessment fusion, VMAF, and aesthetic quality metrics.

13. The method of claim 1, wherein the external encoder comprises a standards-based image encoder such as an ISO JPEG or ISO MPEG encoder, or a proprietary or royalty-free encoder, such an AOMedia encoder.

14. A computing device comprising:
   a processor; and a memory,
wherein the computing device is arranged to perform, using the processor, a method comprising:
receiving input image data representing at least one image;
encoding, at an encoding stage of an image encoder emulator, the input image data to generate encoded image data, the encoding stage comprising a network of inter-connected weights;
decoding, at a decoding stage of the image encoder emulator, the encoded image data to generate a first distorted version of the input image data;
receiving a second distorted version of the input image data generated using an external image encoder;
comparing the first distorted version of the input image data with the second distorted version of the input image data to determine a distortion difference score;
predicting, using a rate prediction model, a first encoding bitrate associated with encoding the input image data to a quality corresponding to the first distorted version;
receiving a second encoding, bitrate used by the external encoder to encode the input image data to a quality corresponding to the second distorted version;
determining a rate difference score by comparing the predicted encoding bitrate with the received second encoding bitrate used by the external encoder to encode the input image data to a quality corresponding to the second distorted version; and
training the weights of the encoding stage based on the distortion difference score and the rate difference score, thereby to configure the image encoder emulator to emulate behavior of the external image encoder.

15. A non-transitory computer-readable medium comprising computer-executable instructions that, when executed by a processor of a computing device, cause the computing device to perform a method, the method comprising:
receiving input image data representing at least one image;
encoding, at an encoding stage of an image encoder emulator, the input image data to generate encoded image data, the encoding stage comprising a network of inter-connected weights:
decoding, at a decoding stage of the image encoder emulator, the encoded image data to generate a first distorted version of the input image data;
receiving a second distorted version of the input image data generated using an external image encoder;
comparing the first distorted version of the input image data with the second distorted version of the input image data to determine a distortion difference score;
predicting, using a rate prediction model, a first encoding bitrate associated with encoding the input image data to a quality corresponding to the first distorted version;
receiving a second encoding bitrate used by the external encoder to encode the input image data to a quality corresponding to the second distorted version;
determining a rate difference score by comparing the predicted encoding bitrate with the received second encoding bitrate used by the external encoder to encode the input image data to a quality corresponding to the second distorted version; and
training the weights of the encoding stage based on the distortion difference score and the rate difference score, thereby to configure the image encoder emulator to emulate behavior of the external image encoder.

* * * * *

UNITED STATES PATENT AND TRADEMARK OFFICE
CERTIFICATE OF CORRECTION

| | |
|---|---|
| PATENT NO. | : 11,252,417 B2 |
| APPLICATION NO. | : 17/039563 |
| DATED | : February 15, 2022 |
| INVENTOR(S) | : Ioannis Andreopoulos |

It is certified that error appears in the above-identified patent and that said Letters Patent is hereby corrected as shown below:

On the Title Page

Column 1, Item (73), assignee cite no. 1, delete "Size Limited, London (GB)" and insert --iSize Limited, London (GB)--, therefor.

Signed and Sealed this
Twentieth Day of December, 2022

*Katherine Kelly Vidal*

Katherine Kelly Vidal
*Director of the United States Patent and Trademark Office*